XR 3,812,496

United Stat[e]
Brooks

[11] 3,812,496
[45] May 21, 1974

[54] OPTICAL SIGNAL RECORDING SYSTEM

[75] Inventor: Robert E. Brooks, Redondo Beach, Calif.

[73] Assignee: TRW Inc., Redondo Beach, Calif.

[22] Filed: Aug. 22, 1972

[21] Appl. No.: 282,670

[52] U.S. Cl. ............ 346/108, 340/173 LM, 350/3.5
[51] Int. Cl. ............ G01d 9/28
[58] Field of Search ............ 346/108; 350/3.5; 340/173 LM; 179/100.3 R, 100.3 B

[56] References Cited

UNITED STATES PATENTS

| | | | |
|---|---|---|---|
| 3,758,187 | 9/1973 | Thomas et al. | 350/3.5 |
| 3,606,517 | 9/1971 | Jacobson et al. | 350/3.5 |
| 3,646,335 | 2/1972 | Cindrich | 350/3.5 X |
| 3,657,473 | 4/1972 | Corcoran | 350/3.5 X |
| 3,427,629 | 2/1969 | Jacobs et al. | 346/108 X |
| 3,612,658 | 10/1971 | Slaymaker | 350/162 SF |
| 3,674,332 | 7/1972 | Kogelnik | 350/3.5 |
| 3,697,149 | 10/1972 | Heeckeren et al. | 350/3.5 |

3,547,510

*Primary Examiner*—Joseph W. Hartary
*Attorney, Agent, or Firm*—Daniel T. Anderson, Esq.; Edwin A. Oser, Esq.; Jerry A. Dinardo

[57] ABSTRACT

An optical system for recording time-varying signals which may have a wide range of amplitudes. The signal is recorded on a light sensitive material by means of an unmodulated and a modulated coherent light beam. The two light beams generate a diffraction grating on the recording material. Since one of the beams is modulated the grating is modulated. The recording is preferably effected through a slit having a narrow dimension in the direction of motion of the film and a relatively long direction normal thereto. The modulation may be effected, for example, by modulating the intensity of one of the beams, the phase of the recording beams or the angle between the two beams. The instantaneous signal value is represented by the contrast, spatial frequency or the phase of the grating pattern. The signal may be reproduced by a reproducing beam. The light beam is diffracted in accordance with the grating constant of the diffraction grating and may be picked up by a photosensitive detector. It is also feasible to read out simultaneously a large portion of the recorded track to obtain the Fourier transform of the signal or its power spectrum.

4 Claims, 11 Drawing Figures

3812496
OR IN 346/108

OPTICAL SIGNAL RECORDING SYSTEM

BACKGROUND OF THE INVENTION

This invention relates generally to an optical signal recording system, and particularly to a system adapted for providing a high-density recording of time-varying electrical signals having a wide range of amplitudes.

Optical signal recording has been widely used in the past, for example, in the motion picture industry for providing a sound track on a motion picture film. While the recording quality of such a sound track is high, the recording density is relatively low. By way of example, the speed of the film on which motion pictures are recorded is about 18" per second.

Attempts have been made to increase the recording density of optical recording systems. Thus, it has been proposed to make use of laser signal recorders. The intensity of the laser beam may be modulated by a light modulator, and the modulated beam focused on the recording film. The modulated beam is scanned across the film. Because the laser beam can be focused to a very small spot size, the recording density can be made very high. However, with conventional recording systems both linearity and dynamic range are severely limited. This is due to the nonlinear properties of the photographic emulsion which causes harmonic and intermodulation distortion. Furthermore, a serious problem results because tracking of the very narrow recording band during playback is difficult.

In order to effect optical signal processing a time segment of the signal should be available in a form which can spatially modulate a beam of incident coherent light. This type of processing has been used in the generation of radar maps from side-looking radar systems. It has also been used for the spectrum analysis of acoustic and radio-frequency signals.

Systems of this type often require that a wide range of signal amplitudes be faithfully recorded. A modulated oscilloscope pattern or a modulated laser beam can serve as a control of the light source for exposing the film. Elaborate processing of the photographic film must be employed to ensure a linear transmittance-exposure characteristic. With all possible precautions a dynamic range to 20 db (decibels) can be obtained, but this is frequently insufficient.

If it is desired to record a plurality of separate tracks the number of such tracks is limited by the problem of separating upon reproduction one track from the other.

It is accordingly an object of the present invention to provide an optical recording system which provides a greater linear recording range than prior art systems, thereby to minimize harmonic and intermodulation distortion.

A further object of the invention is to provide an optical recording system which directly permits optical data processing such as Fourier transforms to yield directly a power spectrum without the need of special processing of the recording film.

Another object of the present invention is to provide an optical recording system of the type discussed which is substantially immune to the results of dirt, scratches or small imperfections of the film.

Still a further object of the present invention is to permit recording of a plurality of very narrow tracks or recording of several tracks superimposed on each other which can be readily separated upon reproduction and without the danger of crosstalk between individual tracks.

SUMMARY OF THE INVENTION

In accordance with the present invention there is provided an optical system for recording signals which may have a wide range of amplitudes. The system comprises a source of coherent light such, for example, as a laser. The laser light is split into a first and a second beam and the two beams are recombined at a predetermined angle in a predetermined plane where a recording material is disposed. Means are provided for modulating the first laser beam. Finally, means are provided for creating a relative movement between the two beams and the recording material.

As a result, an optical grating is recorded on the recording material which is modulated in accordance with the signal. Thus, the grating may have its contrast, that is its diffraction efficiency modulated, or its spatial frequency or its phase. Specifically, it is possible to modulate the amplitude or the intensity of one of the beams. Phase modulation may be effected by modulating the relative phase of the two beams. It is also feasible to modulate the grating frequency by modulating the angle between the beam either continuously or abruptly in accordance with a frequency shift keying scheme.

It is also feasible to record with the same optical system a plurality of tracks parallel to each other. Finally, two tracks may be recorded on top of each other, each having a different grating frequency which may be varied by varying the angle between the two beams or the frequency of the light.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
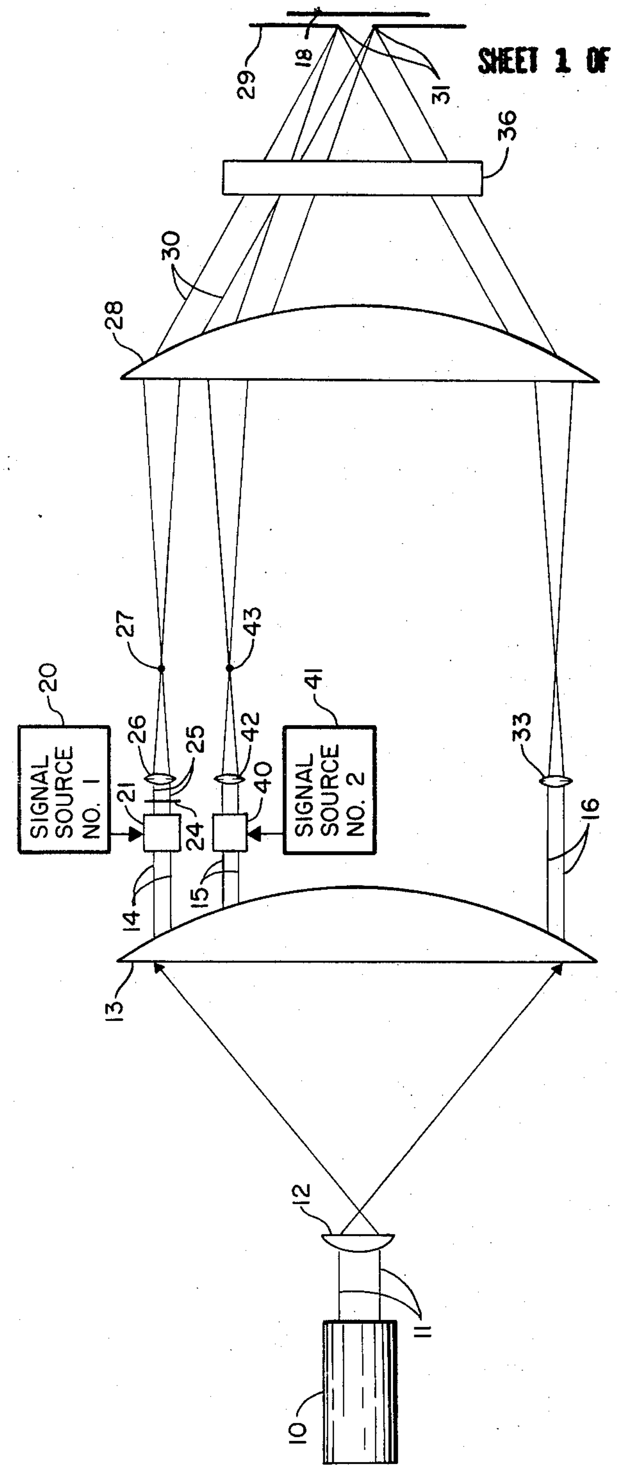
FIG. 1 is a schematic top plan view of an optical signal recording apparatus in accordance with the present invention for recording in real time a plurality of signals.
Figure 2:
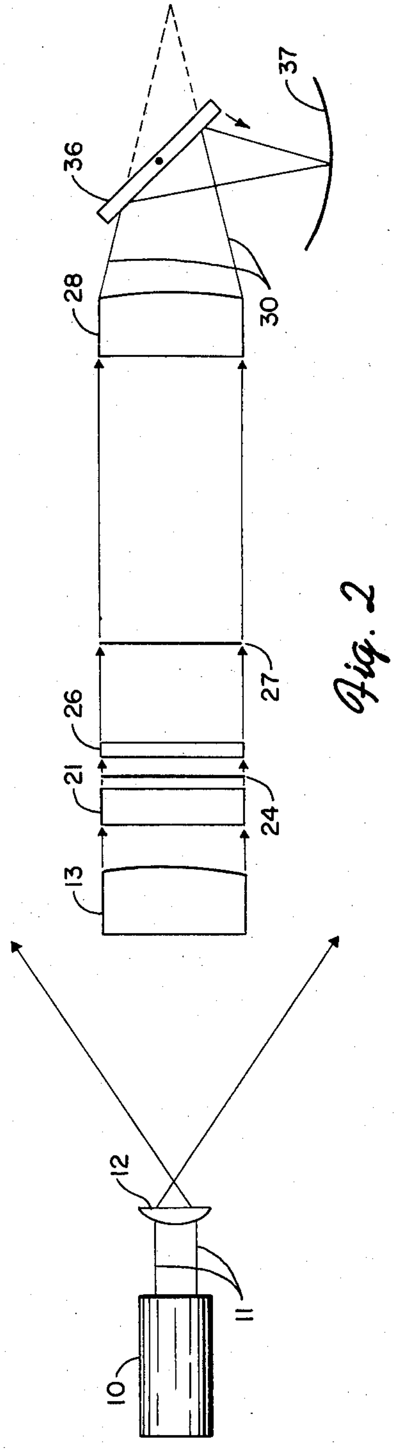
FIG. 2 is a side elevational view of the apparatus of FIG. 1 slightly modified.

Referring now to the drawings, wherein like elements are designated by the same reference characters and particularly to FIGS. 1 and 2, there is illustrated an optical signal recording system in accordance with the present invention. The system illustrated is capable of recording simultaneously a plurality of signals such as electrical signals on a single track in such a manner that, upon reproduction, each signal may readily be separated from the others.

The system includes a coherent light source 10 which may be a laser as shown. The laser may be a continuous wave laser such as a helium-neon laser. Alternatively, the laser may be a pulsed laser having a pulse repetition rate sufficiently higher than the highest signal frequency so that the signal is adequately sampled. The laser 10 may generate a collimated output beam 11 which is usually linearly polarized. If the laser beam 11 is not linearly polarized it may be desirable to interpose a polarizer into the path of the laser beam 11. It may be convenient to enlarge and collimate the laser output beam 11. This may be effected by an optical telescope consisting of a pair of positive lenses 12 and 13. The enlarged and collimated laser beam may now be split into a plurality of separate beams such as shown in 14, 15 and 16. Where needed individual polarizers may also be interposed into the path of each of the beams 14, 15, 16 instead of into the path of beam 11. The beam splitting may be effected in a conventional manner. As shown in FIG. 1, the collimated light beam may simply be split by wave front division so that one portion of the light forms beam 14, another portion provides beam 15 and so on to the last portion of the light forming the beam 16.

In accordance with the present invention one of the beams such as 16 remains unmodulated. Another beam such as beam 14 is modulated in accordance with a first signal which may be an electric signal and the two beams are recombined in a recording plane 18. Accordingly, a signal source No. 1 which is shown schematically at 20 applies its output signal to an optical modulator 21. Preferably, the signal developed by signal source No. 1 is an analog signal which may be defined as a signal having a continuous range of variations of the signal level or amplitude as a function of time such, for example, as an audio or video signal. This is distinguished from a digital signal having only two signal levels without variations therebetween. Accordingly, the modulator 21 will modulate the light beam 14 in any one of a number of different fashions. For purposes of discussion it will now be assumed that the modulator 21 simply modulates the amplitude or intensity of the light beam 14. It will subsequently be shown in connection with FIGS. 7 through 9 that different forms of modulation may be used instead.

The amplitude modulation or intensity modulation of the beam 14 may be effected by an electro-optical device such as a Pockels or Kerr cell which operates as a rotor of the polarization of the light. Thus, the modulator 21 may simply be a polarization modulator using electrically induced birefringence to rotate the polarization of the light beam 14.

Figure 4:
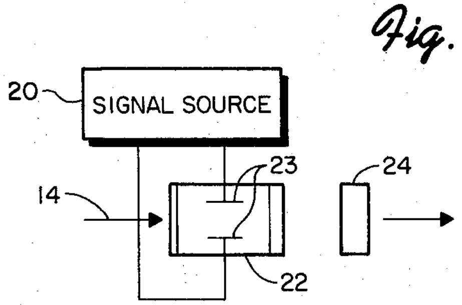
FIG. 4 is a schematic representation of a signal source and modulator for modulating the intensity of one of the two light beams of the apparatus of FIGS. 1 and 2.

Such an amplitude modulator has been shown in FIG. 4 by way of example. It includes a signal source 20 and a Kerr cell 22 having a pair of electrodes 23 upon which the signal from the source 20 is impressed. The light beam 14 is shown schematically by an arrow. The contrast or the diffraction efficiency of an interference pattern such as is formed by the modulated beam 14 and the unmodulated beam 16 depends on the relative polarization of the two interfering light beams. In other words only that polarization vector of the light beam 14 which is parallel to the polarization of the unmodulated beam 16 is capable of interfering with the beam 16. Accordingly, as a result of this type of modulation the diffraction efficiency of the interference pattern is modulated.

It may be desired to modulate the amplitude or intensity of the light beam 14 without varying its polarization. In that case a conventional analyzer 24 may be used following the modulator 21. The analyzer 24 only passes light having a predetermined direction of polarization which preferably is parallel to the direction of polarization of the unmodulated beam 16.

It should be noted that other types of amplitude modulators are known. Among these are mechanical shutters, devices based upon optical scattering caused by liquid crystals, and certain ferroelectric ceramics and interference spoiling modulators. Modulators of this type are tabulated in a paper by H. N. Roberts entitled "Strain-Biased PLZT Input Devices (Page Composers) for Holographic Memories and Optical Data Processing" appearing in Applied Optics, Volume 11, pages 397 to 404 of February 1972.

It is desirable to form the modulated beam 25 (see FIGS. 1 and 2) into a desired cross section, that is a rectangular cross section with a narrow width compared to its height. In order not to lose optical efficiency additional optical elements are conventionally used. To this end there may be provided for the beam 25 a cylinder lens 26 which forms a line focus 27 in the front focal plane of a spherical lens 28 common to all the beams. The light beam 30 emerging from the spherical lens 28 forms a slit focus in the recording plane 18. A recording material such as a photographic film may be disposed in the plane 18. The slit lies in the plane of FIG. 1. With high quality optics the width of the slit is determined by the optical wavelength, the focal length of lens 28 and the length of the line focus 27. A focusing slit width of a few microns is possible. Since the slit width plays a role similar to the head gap for magnetic tape recorders in determining the high-frequency response of the recorder, such a narrow slit width permits high-frequency signal recording.

A narrow mask 29 having a rectangular aperture 31 located near and in front of the recording material 18 may additionally be used to define the extent of the recording area and eliminate stray light from striking the recording material.

Beam 16 which is unmodulated by any signal is also formed into a desirable cross section by a cylinder lens 33 and the common spherical lens 28 and intersects beam 30 at the recording plane 18. It will be appreciated that a number of different optical systems may be used to bring beams 14 and 16 into coincidence at the recording plane. The system illustrated in FIGS. 1 and 2 is only illustrative.

Figure 3:
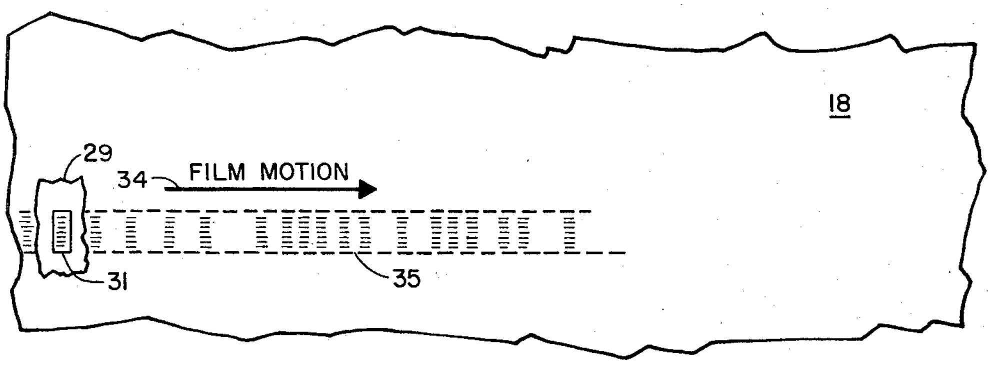
FIG. 3 is a plan view of a portion of a film on which a signal has been recorded in the form of a track by the apparatus of FIGS. 1 and 2.

It will now be appreciated that the two beams 14 and 16 focused at the recording plane 18 interfere with each other to generate an interference pattern. This has been illustrated in FIG. 3 where 18 shows a portion of a film moving in the direction of the arrow 34. FIG. 3 also illustrates the mask 29 with its rectangular aperture 31. It will now be seen that the two beams form parallel interference fringes along the direction of arrow 34. The distance between these fringes or the grating constant depends on the relative angles of the two beams 14 and 16 at the recording plane, and on the frequency or wavelength of the two light beams. The results of modulating the amplitude or intensity of the light beam 14 is also shown by the film track 35 of FIG. 3. In other words each of the parallel fringes has its density modulated from a maximum to a minimum value so that the parallel lines are either fully visible or not visible at all.

In order to record the signal obtained from signal source 20, the film 18 must be moved with respect to the mask 30 so that a new or unexposed portion of the recording material is continuously exposed to the beams 14 and 16. For example, the film 18 may be moved in a direction normal to the paper plane of FIG. 1. Accordingly, if the recorded material is a photographic film or other flexible material, a film or tape transport system as commonly used in a tape recorder may be used to provide the necessary film motion. Alternatively, as shown in FIG. 2, it is feasible to provide a rotatable or tiltable mirror 36 to deflect the two beams across a stationary film 37. In this case the recording film 37 may have to be curved along the surface of a cylinder as shown so as to maintain sharp focus and proper interference of the two recording beams. The mirror 36 may be rotated or tilted in any suitable manner.

In accordance with the present invention it is also feasible to record two separate signals on the same track. Nevertheless, it is possible to separate the two recorded tracks upon reproduction of the signal. Thus, a second modulator 40 which may be identical with the modulator 21, may be provided and connected to a second signal source 41. The modulator 40 is disposed in the path of the beam 15 and may be followed by a cylinder lens 42 which again provides a line focus at 43. The beam is further shaped by the common spherical lens 28 and again falls on the recording film 24 where it also interferes with the unmodulated beam 16. However, since the second modulated beam 15 forms a different angle with the unmodulated beam 16 at the recording plane 18 the thus created grating has a different spacing or grating constant. Upon reproduction light diffracted by this second grating will be focused or directed to a different point.

It is conventional practice to cause the unmodulated beam 16 to be much more intense at the recording plane 18 than any of the modulated beams such as 14 and 15. Accordingly, the intermodulation products generated by the interference of two or more modulated beams are small.

It will be understood that more than two modulated light beams such as 14 and 15 may be used, each one being provided with its separate modulator. All that is necessary is to make sure that the angles of each of the modulated beams with the unmodulated beam are sufficiently different so that the different signals can be reproduced substantially without interference with each other.

Figure 5:
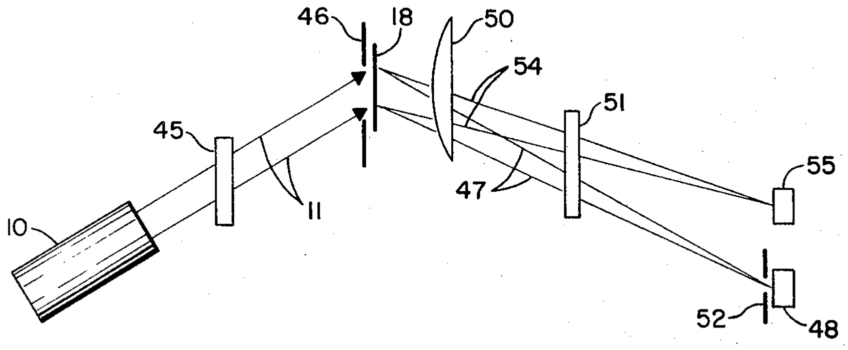
FIG. 5 is a schematic top plan view of an apparatus for reading out or reconstructing optically the signal recorded on a film by the apparatus of FIGS. 1 and 2.
Figure 6:
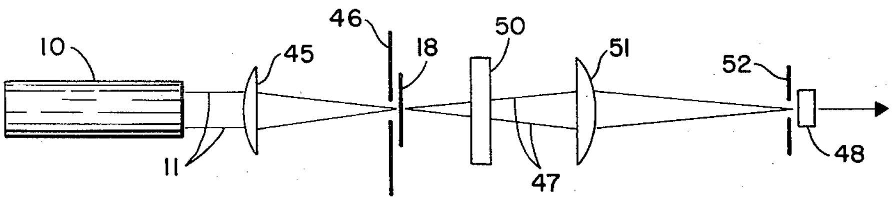
FIG. 6 is a side elevational view of the apparatus of FIG. 5.

To read out or reproduce the signals recorded on the film 18 the apparatus illustrated in FIGS. 5 and 6 may be utilized. As shown here the film 18 is illuminated with a beam of light from the laser 10 which may be a continuous gas laser. In order to form the laser beam 11 into a narrow slit to provide the highest signal frequency response the laser may be focused to a slit by a cylinder lens 45 so that the focused rectangular light beam falls on the film 18. It may be necessary again in certain instances to constrain or limit the size of the illuminating beam by means of a mask 46 placed in front of the film 18.

Assuming now that only a single channel is recorded on the film 18 then only a single diffracted beam 47 is detected. The light in the beam 47 may be detected, for example, with a photodetector 48. In order to ensure that substantially all of the diffracted light in the beam 47 falls on the detector 48 and to minimize unwanted scattered light falling on the detector a cylinder lens 50 focuses the beam in the plane of FIG. 6. Another cylinder lens 51 images the recorded signal onto the detector 48 in order to concentrate the light in the plane of FIG. 5. In order to restrict the sensitive area of the detector to the concentrated signal beam it may be desirable to use a mask 52 in front of the detector 48. The reproducing apparatus of FIGS. 5 and 6 is only an example and many other optical systems may be used instead for directing the diffracted beam onto a detector.

If a second signal has been recorded on the film 18 in the manner explained in connection with the FIGS. 1 and 2, this second signal gives rise to another diffracted beam 54. The diffracted beam 54 emerges from the film at an angle different from that of the beam 47 for the reasons previously explained. Accordingly, the same optics consisting of lenses 50 and 51 may be used to concentrate this beam 54 onto a second detector 55 in the same way that the first signal was concentrated. Again, a mask such as shown at 52 may be used in front of the detector 55 but has been omitted for the sake of clarity. It will readily be understood that other signals which have also been recorded on the same film track may be placed back or recovered from the film substantially without mutual interference.

In connection with FIGS. 1, 2 and 4 it has been indicated that the light beam such as beam 14 may be modulated not only in accordance with its intensity but in some other fashion. For example, it is feasible to modulate the optical phase of one of the beams with respect to the unmodulated beam. This may be called interference spoiling or reducing the diffraction efficiency. It may be effected, for example, by vibrating a mirror in accordance with an electric signal, thereby to modulate the phase of the light beam.

Figure 7:
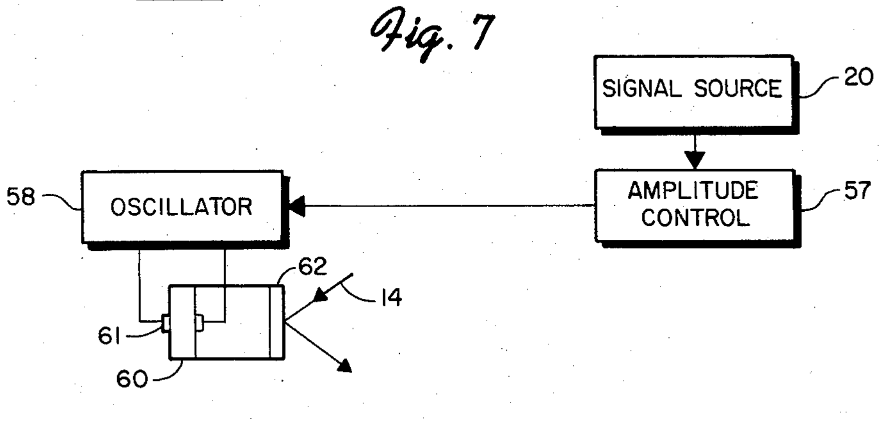
FIG. 7 is a schematic representation of a modulator for periodically modulating the optical phase of the recorded signal.
Figure 8:
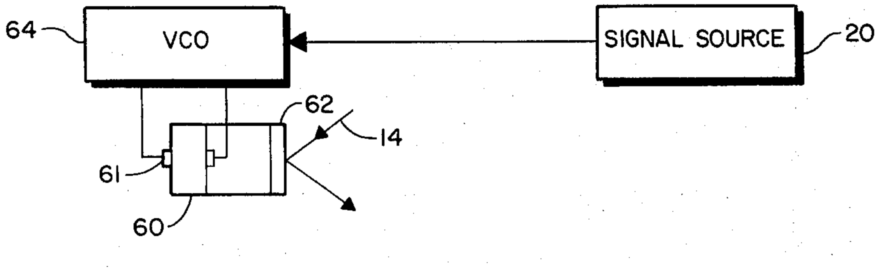
FIG. 8 is a schematic representation of a modulator for periodically modulating the optical phase, where the modulation frequency is controlled by the signal.

This phase modulation has been illustrated in FIG. 7 to which reference is now made. Here a signal source 20 is shown connected to an amplitude control 57 which in turn modulates the amplitude of an oscillator 58, hence the oscillator has a constant frequency but a variable amplitude. The oscillator 58 is connected across the electrodes 61 of a piezoelectric crystal 60 to which a mirror 62 is mechanically connected. Accordingly, the mirror 62 vibrates more or less in accordance with the signal received from the signal source 20. The mirror 62 is interposed into the path of the beam 14. This will now modulate the phase of the modulated beam 14 thereby blurring or spoiling the interference pattern to a greater or lesser extent due to the fact that the phase of one beam is modulated with respect to the phase of the unmodulated beam 16. If the phase of the light beam is slowly varied this results in a grating with a set of undulating lines 35 (see FIG. 3).

It is also feasible to provide modulation by varying the frequency of the mirror motion in the system of the present invention. Thus it is possible to vary the phase of the modulated beam directly in accordance with the signal. This may be effected by the modulator shown in FIG. 8. Here the signal source 20 is connected to a voltage-controlled oscillator (VCO) 64 which in turn in connected across the electrodes 61 to the piezoelectric crystal 60 connected to the mirror 62. In this case now the frequency of the oscillator varies as a direct function of the signal but its amplitude remains constant. This in turn will vary the phase of the modulated beam 25, thereby to cause interference spoiling.

In accordance with the present invention it is also feasible to provide a system which eliminates substantially the effects of variation of the light intensity of the laser source 10. This may be effected by recording a separate second track on the film 18. This second track consists simply of the interference of two unmodulated beams. The signal now is the ratio of the diffracted light intensities of the two tracks. If the laser intensity varies so will the effect of both of the tracks vary simultaneously. The second track may be adjacent the track 35 or preferably superimposed on the track 35 with a different grating constant.

As indicated above, it is feasible to record two separate signals on the same track by making use of two different grating frequencies. As mentioned before, this may be effected by using different angles for different signal beams. Such a system may be used for frequency shift keying, that is by suddenly shifting the angle of the modulated beam between two predetermined values.

Figure 9:
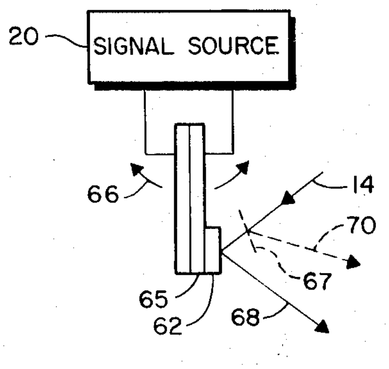
FIG. 9 is a schematic representation of another modulator for modulating the angle of the modulated beam.

Alternatively, the modulator of FIG. 9 may be used. Here the signal source 20 is connected across a bimorph 65 which will flex or bend in accordance with an applied electric signal. A mirror 62 is mounted at the end of the bimorph 65 which flexes as shown by the arrows 66. The mirror 62 may, for example, be moved into the dotted position 67 so that the beam 14 may be reflected either as shown at 68 or at 70, thereby to vary or modulate the beam angle. This will modulate the grating constant.

It will be understood that it is also feasible to change or vary the frequency of the laser 10. This may, for example, be effected by varying the temperature of the laser or by applying a suitable magnetic field or in any other known manner. This will, of course, change or vary the recorded grating pattern because as indicated before the grating pattern depends not only on the angle of the two beams, but also on the frequency or wavelength of the two beams.

Figure 10:
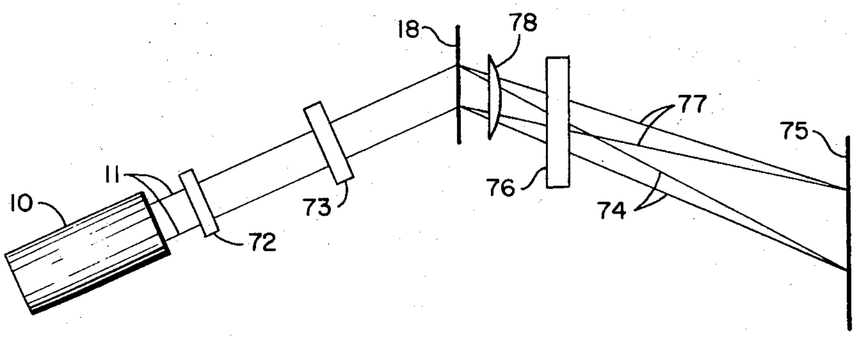
FIG. 10 is a schematic top plan view of apparatus for reading out the Fourier transform of a signal recorded, for example, by the apparatus of FIGS. 1 and 2.

In accordance with the present invention it is also feasible to generate directly the Fourier transform or power spectrum of signals recorded, for example, in the apparatus of FIGS. 1 and 2. To this end the apparatus of FIGS. 10 and 11 may be used. The light from the laser 10 which may be a continuous wave gas laser illuminates the track recorded on the film 18. In order to obtain high spectral resolution the length of the track should be appreciable and may be longer than the natural diameter of the laser beam. Accordingly, the laser beam 11 may be enlarged and collimated by a pair of cylinder lenses 72 and 73. The lenses 72 and 73 expand the laser beam 11 in the plane of FIG. 11. However, since the normal width of the recorded track may be only one millimeter the natural width of the beam often suffices to illuminate the track width as shown in FIG. 10 but not its length.

The light diffracted from a signal recorded on the track of the film 18 forms an output beam 74. Since a large segment of the signal is illuminated simultaneously the various portions of the signal beam representing different diffraction intensities cause a spatial variation of the beam in the direction of the plane of FIG. 11. The far field diffraction of this amplitude variation represents the Fourier transform of the illuminated signal segments. This Fourier transform is formed in the focal plane 75 of a cylinder lens 76. A second signal which may have been recorded on the illuminated track forms another diffracted beam at 77 and is likewise spectrally analyzed in the focal plane 75 of the lens 76. A second cylinder lens 78 may be used to concentrate the spectral distribution in the plane of FIG. 11 and in the focal plane 75. The cylinder lens 78 or both lenses 76, 78 may also be disposed in front of the film 18 instead of in the position shown in FIGS. 10 and 11.

Figure 11:
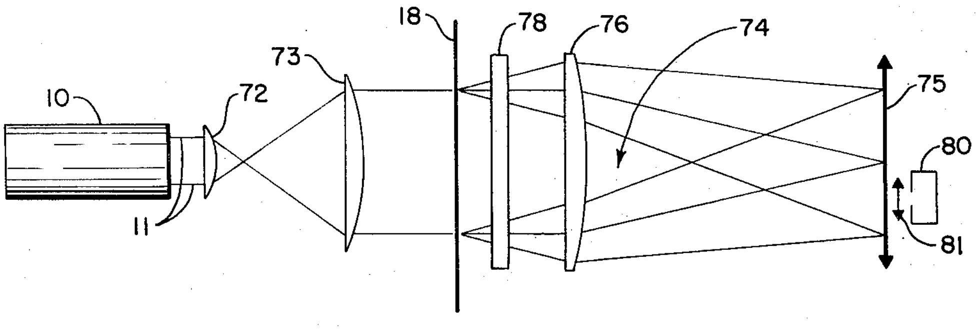
FIG. 11 is a side elevational view of the apparatus of FIG. 10.

The signal which is read out in the focal plane 75 may be detected by a detector 80 which may be scanned along the focal plane 75 in the direction shown by arrows 81 as shown in FIG. 11. This will then generate a signal of the Fourier transform or power spectrum of the recorded signal. Alternatively the light pattern at the focal plane 75 may be photographed, viewed by the eye of the observer or projected on a screen.

There has thus been disclosed an optical system for recording signals which provides greater linear recording range even though a photographic emulsion has notoriously non-linear characteristics. Since the recorded information is disposed over a large portion of the recording material the signal is substantially immune to dirt, scratches or imperfections of the film. The system of the present invention permits optical data processing. Among others the Fourier transform or power spectrum may be directly obtained. Furthermore, it is feasible to superimpose several signals on the same narrow recording track without interference of the signals with each other. Since the recording system provides a substantial linear recording range harmonic and intermodulation distortion is held to a minimum. However, the ratio of the modulated beam intensity to the unmodulated beam intensity should be kept small to stay within the linear transmittance-exposure range of the film.

What is claimed is:

1. An optical system for recording a plurality of time-varying analog electrical signals, said system comprising:

a. a laser for generating coherent light;

b. means for splitting the laser light into a first beam, a second beam and a third beam;

c. optical means for recombining said beams in a predetermined plane;

d. a recording material disposed in said plane;

e. means coupled to said recording material and to said optical means for creating a continuous relative movement between said recording material and said beams;

f. means for modulating said first beam in accordance with a first analog electric signal to be recorded, whereby a first grating is recorded on said recording material, said first grating being modulated in accordance with said first signal; and g. means for modulating said second beam in accordance with a second analog electrical signal to be recorded, whereby a second grating is recorded on said recording material, said second grating being superimposed on said first grating and being modulated in accordance with said second signal, said first and third beams forming a first predetermined angle at said plane, and said second and third beam forming a second, different predetermined angle at said plane whereby said gratings have different grating constants.

2. An optical system for recording a plurality of time-varying analog electrical signals, said system comprising:

a. a laser for generating coherent light;

b. means for splitting the laser light into a first beam, a second beam and a third beam;

c. optical means for recombining said beams in a predetermined plane;

d. a recording material disposed in said plane;

e. means coupled to said recording material and to said optical means for creating a continuous relative movement between said recording material and said beams;

f. means for modulating said first beam in accordance with a first analog electric signal to be recorded, whereby a first grating is recorded on said recording material, said first grating being modulated in accordance with said first signal;

g. means for modulating said second beam in accordance with a second analog electrical signal to be recorded, whereby a second grating is recorded on said recording material, said second grating being superimposed on said first grating and being modulated in accordance with said second signal, said first and third beams forming a first predetermined angle at said plane, and said second and third beam forming a second, different predetermined angle at said plane whereby said gratings have different grating constants; and h. optical means disposed in the paths of said beams for forming said beams into a substantially rectangular shape at said plane, said rectangle having a relatively small dimension in the direction of relative movement of the recording material and a relatively large dimension normal thereto.

3. An optical system for recording a time-varying analog electrical signal having a wide range of amplitudes, said system comprising:

a. a laser for generating a coherent light beam;

b. means for splitting the laser light into a first, a second, a third and a fourth beam;

c. optical means for recombining said first and said second beam in a predetermined plane and for recombining said third and fourth beam in said predetermined plane and adjacent said first and second beams;

d. a recording material disposed in said plane;

e. means coupled to said recording material and to said optical means for creating a continuous relative movement between said recording material on the one hand and said first and second beam, and said third and fourth beam on the other hand; and f. means for modulating said first beam in accordance with an electrical analog signal to be recorded, whereby a first modulated grating is recorded on said recording material, and whereby a second unmodulated grating is recorded on said recording material, so that the signal may be recovered as the ratio of the diffraction efficiencies of said two gratings.

4. An optical system for recording a time-varying analog electrical signal having a wide range of amplitudes, said system comprising:

a. a laser for generating a coherent light beam;

b. means for splitting the laser light into a first, a second, a third and a fourth beam;

c. optical means for recombining said first and said second beam in a predetermined plane and for recombining said third and fourth beam in said predetermined plane and adjacent said first and second beams;

d. a recording material disposed in said plane;

e. means coupled to said recording material and to said optical means for creating a continuous relative movement between said recording material on the one hand and said first and second beam, and said third and fourth beam on the other hand;

f. means for modulating said first beam in accordance with an electrical analog signal to be recorded, whereby a first modulated grating is recorded on said recording material, and whereby a second unmodulated grating is recorded on said recording material, so that the signal may be recovered as the ratio of the diffraction efficiencies of said two gratings; and g. a mask having an aperture disposed in front of said predetermined plane and in the path of said beams, said aperture having a slit with a relatively small opening in the direction of relative movement of the recording material and a relatively large opening normal thereto.

* * * * *